United States Patent
Maeda et al.

(10) Patent No.: US 9,727,794 B2
(45) Date of Patent: Aug. 8, 2017

(54) IMAGE PROCESSING APPARATUS AND LANE PARTITION LINE RECOGNITION SYSTEM INCLUDING THE SAME

(71) Applicant: DENSO CORPORATION, Kariya, Aichi-pref. (JP)

(72) Inventors: Yuu Maeda, Ichinomiya (JP); Shunsuke Suzuki, Kariya (JP); Naoki Kawasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/965,041

(22) Filed: Dec. 10, 2015

(65) Prior Publication Data
US 2016/0196474 A1 Jul. 7, 2016

(30) Foreign Application Priority Data
Dec. 10, 2014 (JP) ................. 2014-249893

(51) Int. Cl.
*G06K 9/00* (2006.01)
*G06T 5/00* (2006.01)

(52) U.S. Cl.
CPC .......... *G06K 9/00798* (2013.01); *G06T 5/002* (2013.01); *G06T 2207/10024* (2013.01); *G06T 2207/30256* (2013.01)

(58) Field of Classification Search
CPC .......... G09G 2300/0452; G06T 3/4015; G06T 5/002; G06T 2207/10024; G06T 2207/30256; G02F 1/133514; G06K 9/00798
See application file for complete search history.

(56) References Cited

U.S. PATENT DOCUMENTS

| | | | | |
|---|---|---|---|---|
| 2008/0049048 A1* | 2/2008 | Credelle | ............ | G09G 3/2074 345/690 |
| 2008/0291319 A1* | 11/2008 | Jannard | ................. | G06T 3/4015 348/345 |
| 2009/0002298 A1* | 1/2009 | Furukawa | ................ | G09G 5/02 345/88 |

(Continued)

FOREIGN PATENT DOCUMENTS

| JP | 2009-055281 A | 3/2009 |
|---|---|---|
| JP | 2009-206553 A | 9/2009 |

*Primary Examiner* — Jonathan S Lee
(74) *Attorney, Agent, or Firm* — Knobbe, Martens, Olson & Bear, LLP

(57) ABSTRACT

In an image processing apparatus, an image data acquisition unit acquires image data including R-pixels which are red pixels, holding red luminance values, B-pixels which are blue pixels, holding blue luminance values, G-pixels which are green pixels, holding green luminance values, and C-pixels which are clear pixels, holding luminance values in a wavelength range including wavelength ranges corresponding to red, blue and green. In the apparatus, a determination unit determines whether or not an inequality given by $V_{alc} - V_{alx} < \alpha$ is satisfied, where $V_{alx}$ is a luminance value of a pixel of interest that is one of the R-, B-, and G-pixels in the image data, $V_{alc}$ is a luminance value of the C-pixel or pixels closest to the pixel of interest, and $\alpha$ is a constant, and if the inequality is satisfied, a correction unit corrects the luminance value $V_{alx}$ to be less than the luminance value $V_{alc}$.

2 Claims, 5 Drawing Sheets

(56) References Cited

U.S. PATENT DOCUMENTS

| | | | |
|---|---|---|---|
| 2009/0060389 A1 | 3/2009 | Hasegawa et al. | |
| 2009/0122073 A1* | 5/2009 | Higgins | G09G 3/2003 345/590 |
| 2010/0013748 A1* | 1/2010 | Cok | H04N 9/67 345/83 |
| 2010/0315449 A1* | 12/2010 | Chaji | G09G 3/3208 345/690 |
| 2011/0148910 A1* | 6/2011 | Botzas | G09G 5/02 345/600 |
| 2011/0255779 A1* | 10/2011 | Sloan | H04N 1/60 382/167 |
| 2013/0120472 A1* | 5/2013 | Byun | G09G 5/02 345/690 |
| 2014/0347530 A1* | 11/2014 | Kanou | H04N 9/045 348/254 |
| 2014/0354861 A1* | 12/2014 | Pang | H04N 9/045 348/242 |
| 2015/0091950 A1* | 4/2015 | Park | G09G 3/3291 345/690 |
| 2015/0154937 A1* | 6/2015 | Funatsu | G06T 5/00 345/593 |
| 2015/0356901 A1* | 12/2015 | Chen | G09G 3/2003 345/690 |
| 2015/0365643 A1* | 12/2015 | Shi | G06T 3/4015 348/294 |
| 2016/0005381 A1* | 1/2016 | Yata | G09G 3/2074 345/690 |

* cited by examiner

FIG.3

| B | C | B | C<sub>P5</sub> | B | C<sub>P6</sub> |
|---|---|---|---|---|---|
| G | R | G | R | G<sub>P4</sub> | R |
| B | C | B | C<sub>P2</sub> | B<sub>P8</sub> | C<sub>P7</sub> |
| G | R | G | R<sub>P1</sub> | G | R |
| B | C | B | C<sub>P3</sub> | B | C |
| G | R | G | R | G | R |

FIG.6

| R | C | R | C | R | C |
|---|---|---|---|---|---|
| C | C | C | C | C | C |
| R | C | R | C | R | C |
| C | C | C | C | C | C |
| R | C | R | C | R | C |
| C | C | C | C | C | C |

IMAGE PROCESSING APPARATUS AND LANE PARTITION LINE RECOGNITION SYSTEM INCLUDING THE SAME

CROSS-REFERENCE TO RELATED APPLICATION

This application is based on and claims the benefit of priority from earlier Japanese Patent Application No. 2014-249893 filed Dec. 10, 2014, the description of which is incorporated herein by reference.

BACKGROUND

Technical Field

The present invention relates to an image processing apparatus and a lane partition line recognition system including the same.

Related Art

Conventionally, a technique for capturing an image ahead of an own vehicle using a camera and recognizing lane partition lines in the acquired image data is known. To recognize each lane partition line, edge points where large variations in luminance occur are extracted from the image data and then approximate lines passing though the edge points are calculated by fitting.

However, some noise spikes may occur in the image data. Such phenomena are accentuated when heat is generated by an increase in digital gain of the camera during night hours. A couple of techniques for reducing the noise using an interpolation process have been envisaged (see, for example, Japanese Patent Application Laid-Open Publication No. 2009-55281 or Japanese Patent Application Laid-Open Publication No. 2009-206553).

The technique disclosed in Japanese Patent Application Laid-Open Publication No. 2009-55281 performs an interpolation process using pixels away from a pixel of interest and having the same color as the pixel of interest. This interpolation process may cause the color of the pixel of interest to cloud and thus lower the contrast. In addition, the technique disclosed in Japanese Patent Application Laid-Open Publication No. 2009-206553 sorts luminance values of 25 pixels around the pixel of interest to perform the interpolation process, which may increase a processing load.

In consideration of the foregoing, exemplary embodiments of the present invention are directed to providing an image processing apparatus and a lane partition line recognition system including the image processing apparatus.

SUMMARY

In accordance with a first aspect of the present invention, there is provided an image processing apparatus including: an image data acquisition unit configured to acquire image data including R-pixels which are red pixels, holding respective red luminance values, B-pixels which are blue pixels, holding respective blue luminance values, G-pixels which are green pixels, holding respective green luminance values, and C-pixels which are clear pixels, holding respective luminance values in a wavelength range including wavelength ranges corresponding to red, blue and green; a determination unit configured to determine whether or not an inequality given by $Valc-Valx<\alpha$ is satisfied, where Valx is a luminance value of a pixel of interest that is one of the R-pixels, the B-pixels, and the G-pixels in the image data, Valc is a luminance value of the C-pixel or pixels closest to the pixel of interest, and $\alpha$ is a constant; and a correction unit configured to, if the inequality is satisfied, correct the luminance value Valx of the pixel of interest to be less than the luminance value Valc of the C-pixel or pixels.

The image processing apparatus of the first aspect makes the determination using the luminance value Valc of the C-pixel or pixels closest to the pixel of interest, and in response to the determination, corrects the luminance value Valx of the pixel of interest to be less than the luminance value Valc of the C-pixel or pixels closest to the pixel of interest.

This configuration of the image processing apparatus of the first aspect can reduce noise in the image data. In addition, since the determination and the correction are made using the C-pixel or pixels closest to the pixel of interest, it is unlikely that the color of the pixel of interest is clouded and thus the contrast is lowered after correction. This configuration can reduce the processing load of the image processing apparatus as compared to the method of sorting luminance values of 25 pixels around the pixel of interest to perform the interpolation process.

In accordance with a second aspect of the present invention, there is provided an image processing apparatus including: an image data acquisition unit configured to acquire image data including at least, a first group of pixels including R-pixels which are red pixels, holding respective luminance values in a red wavelength range, and C-pixels which are clear pixels, holding respective luminance values in a wavelength range including a wavelength range corresponding to a color or colors of the first group of pixels; and a correction unit configured to, if a luminance value Valx of a pixel of interest that is one of the first group of pixels exceeds a luminance value Valc of the C-pixel or pixels around the pixel of interest, correct the luminance value Valx of the pixel of interest to be less than the luminance value Valc of the C-pixel or pixels around the pixel of interest.

This configuration of the image processing apparatus of the second aspect can reduce noise in the image data. In addition, this configuration can reduce the processing load of the image processing apparatus as compared to the method of sorting luminance values of 25 pixels around the pixel of interest to perform the interpolation process.

In accordance with a third aspect of the present invention, there is provided a lane partition line recognition system including an image processing apparatus and a lane partition line recognition apparatus. The image processing apparatus includes: an image data acquisition unit configured to acquire image data including R-pixels which are red pixels, holding respective red luminance values, B-pixels which are blue pixels, holding respective blue luminance values, G-pixels which are green pixels, holding respective green luminance values, and C-pixels which are clear pixels, holding respective luminance values in a wavelength range including wavelength ranges corresponding to red, blue and green; a determination unit configured to determine whether or not an inequality given by $Valc-Valx<\alpha$ is satisfied, where Valx is a luminance value of a pixel of interest that is one of the R-pixels, the B-pixels, and the G-pixels in the image data, Valc is a luminance value of the C-pixel or pixels closest to the pixel of interest, and $\alpha$ is a constant; and a correction unit configured to, if the inequality is satisfied, correct the luminance value Valx of the pixel of interest to be less than the luminance value Valc of the C-pixel or pixels. The lane partition line recognition apparatus is configured to use the image data processed in the image processing apparatus to recognize lane partition lines. The lane partition line recognition system of the third aspect can provide similar advantages to those of the image processing apparatus of the first aspect. In addition, the lane partition line recognition system of the third aspect can achieve more accurate recognition of the lane partition lines.

BRIEF DESCRIPTION OF THE DRAWINGS

FIG. 3 is a schematic of pixel arrangement in image data;

FIG. 6 is a schematic of RCCC Bayer arrangement in the image data.

DESCRIPTION OF SPECIFIC EMBODIMENTS

Embodiments of the present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(First Embodiment)

1. Image Processing Apparatus

A configuration of the image processing apparatus 1 will now be described with reference to FIGS. 1-3. The image processing apparatus 1 is mounted in a vehicle. In the following descriptions, the vehicle carrying the apparels is referred to as an own vehicle. The image processing apparatus 1 is a well-known computer including CPU, RAM, ROM and the like. Functions of functional blocks described later can be implemented by the CPU executing computer programs stored in the ROM.

Figure 1:
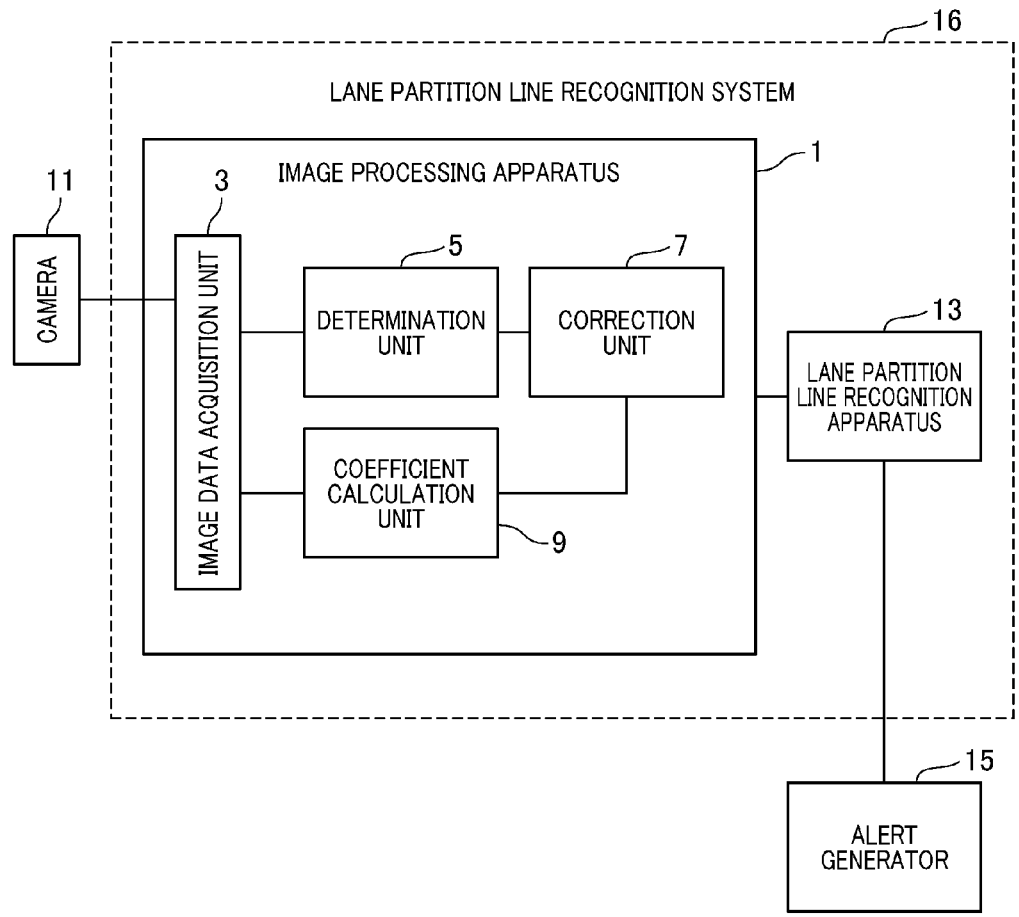
FIG. 1 is a block diagram of an image processing apparatus and a lane partition line recognition system including the image processing apparatus in accordance with one embodiment of the present invention.
Figure 2:
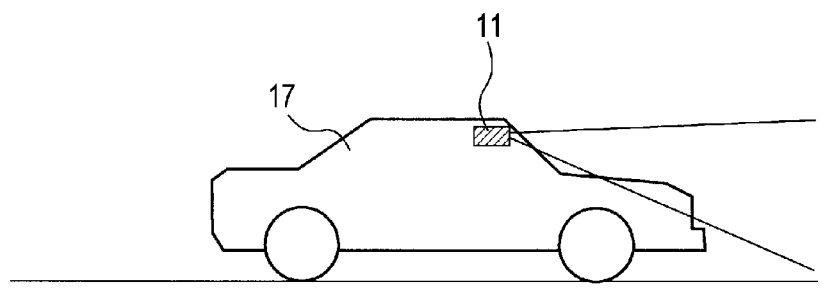
FIG. 2 is a side view of a camera mounted in an own vehicle.

Referring to FIG. 1, the image processing apparatus 1 includes, as functional blocks, an image data acquisition unit 3, a determination unit 5, a correction unit 7, and a coefficient calculation unit 9. Functions of these units will be explained later.

Besides the image processing apparatus 1, the own vehicle 17 includes a camera 11, a lane partition line recognition apparatus 13, and an alert generator 15. The camera 11, as shown in FIG. 2, is positioned looking forward on the front side of the longitudinal center of the own vehicle. A front image captured by the camera 11 includes a roadway forward of the own vehicle 17.

The camera 11 supplies image data to the image data acquisition unit 3. The image data, as shown in FIG. 3, has red pixels (referred to as R-pixels) holding respective red luminance (or intensity) values, blue pixels (referred to as B-pixels) holding respective blue luminance values, green pixels (referred to as G-pixels) holding respective green luminance values, and clear pixels (referred to as C-pixels) holding respective luminance values in a wavelength range including wavelength ranges corresponding to red, blue and green. In FIG. 3, a symbol "R" represents a red pixel, a symbol "B" represents a blue pixel, and a symbol "G" represents a green pixel, and a symbol "C" represents a clear pixel.

In the image data, the pixels are arranged in a Bayer arrangement. Each of the R-, B-, G-, and C-pixels has a luminance value within a range of 0 to 255 gradations.

The lane partition line recognition apparatus 13 is configured to recognize lane partition lines (e.g., white lines, botts' dots and the like) using the image data processed in the image processing apparatus 1. The lane partition line recognition apparatus 13 and the image processing apparatus 1 form the lane partition line recognition system 16.

The alert generator 15 is configured to determine whether or not there is a risk of the own vehicle deviating from a lane partition line recognized by the lane partition line recognition apparatus 13. If there is a risk of the own vehicle deviating from a lane partition line, for example, if there is a small spacing between the own vehicle and a lane partition line in a widthwise direction of the own vehicle and/or if a traveling direction of the own vehicle is a direction in which the own vehicle is likely to deviate from a lane partition line, the alert generator 15 outputs an alert to a driver of the own vehicle.

2. Coefficient Calculation Process to be Performed in Image Processing Apparatus A coefficient calculation process to be performed in the image processing apparatus 1 (particularly, in the image data acquisition unit 3 and the coefficient calculation unit 9) with reference to FIGS. 3 and 4. This process is repeatedly performed every predetermined time interval.

Figure 4:
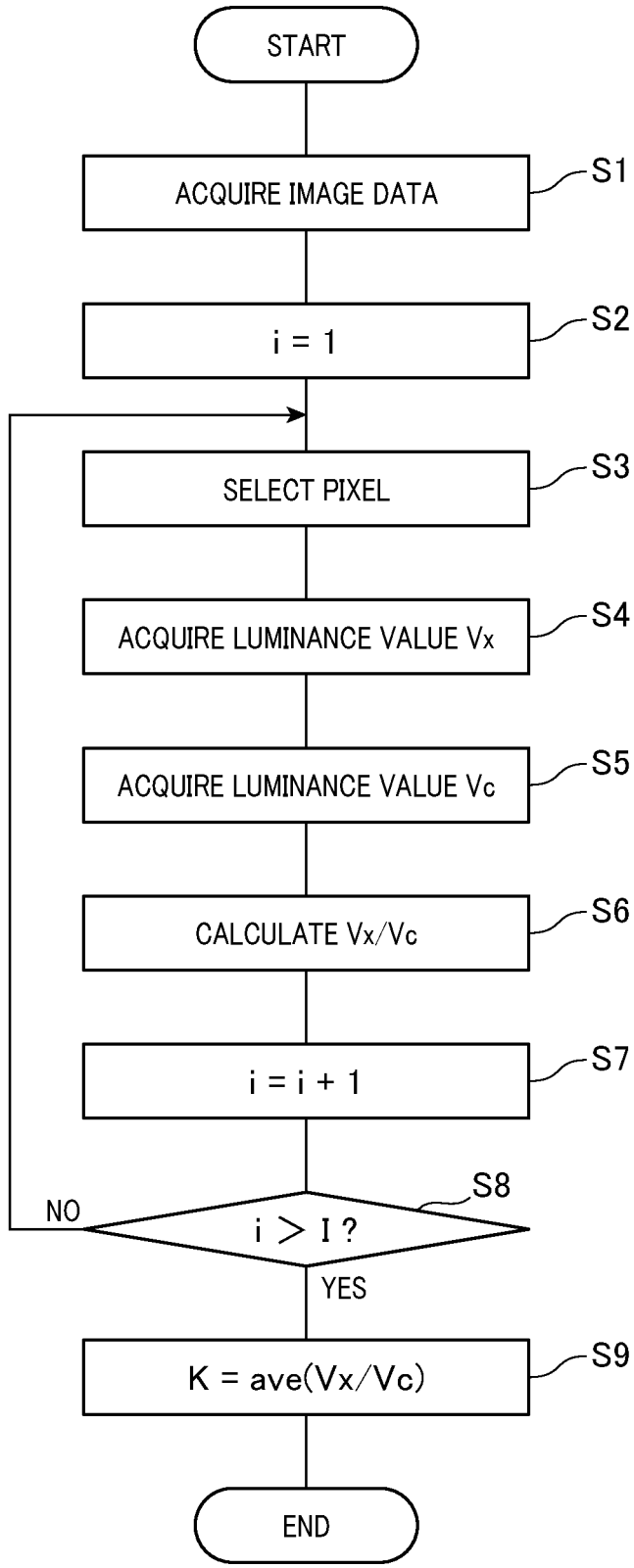
FIG. 4 is a flowchart of a coefficient calculation process to be performed in the image processing apparatus.

In step S1 of FIG. 4, image data is acquired using the camera 11. In step S2, a value of parameter i is set to one where the parameter i represents a number of times steps S3-S6 described later have been performed In step S3, one of the R-pixels, the B-pixels, and the G-pixels in the image data is randomly selected. In the following descriptions, such a randomly selected pixel is referred to as a selected pixel. After step S3 repeatedly performed, randomly selecting pixels in the image data allows positions of the selected pixels to be randomly distributed.

In step S4, a luminance (or intensity) value Vx of the pixel last selected in step S3 is acquired. In step S5, the C-pixel spatially closest to the pixel last selected in step S3 is selected. In the below, such a C-pixel is referred to as an adjacent C-pixel. In the presence of a plurality of C-pixels equally closest to the selected pixel, all of the plurality of C-pixels are selected as adjacent C-pixels.

As an example, in FIG. 3, there are two adjacent C-pixels to the R-pixel labelled P1: the C-pixel labelled P2 and the C-pixel labelled P3. There are four adjacent C-pixels to the G-pixel labelled P4: the C-pixel labelled P2, the C-pixel labelled P5, the C-pixel labelled P6, and the C-pixel labelled P7. There are two adjacent C-pixels to the B-pixel labelled P8: the C-pixel labelled P2 and the C-pixel labelled P7.

A luminance value Vc of the adjacent C-pixel to the selected pixel is acquired. In the presence of a plurality of adjacent C-pixels, an average of luminance values of the plurality of adjacent C-pixels is acquired and denoted by Vc.

In step S6, the luminance value Vx last acquired in step S4 divided by the luminance value Vc last acquired in step S5 is calculated and denoted by Vx/Vc.

In step S7, the value of parameter i is incremented by one.

In step S8, it is determined whether or not the value of parameter i is greater than a predetermined number I (a positive integer). That is, it is determined whether or not I values of Vx/Vc have been acquired by repeatedly performing steps S3-S6. If the value of parameter i is greater than the predetermined number I, then the process flow proceeds to step S9. If the value of parameter i is equal to or less than the predetermined number I, then the process flow proceeds to step S3. The number I may be set as appropriate to an integer between 1 and 10,000.

In step S9, an average of I values of Vx/Vc is calculated and denoted by K as a coefficient described later.

3. Correction Process to be Performed in Image Processing Apparatus

A correction process to be performed in the image processing apparatus 1 will now be described with reference to FIG. 5. The correction process is performed to recognize a lane partition line using the image data of the front image of the own vehicle captured by the camera 11.

Figure 5:
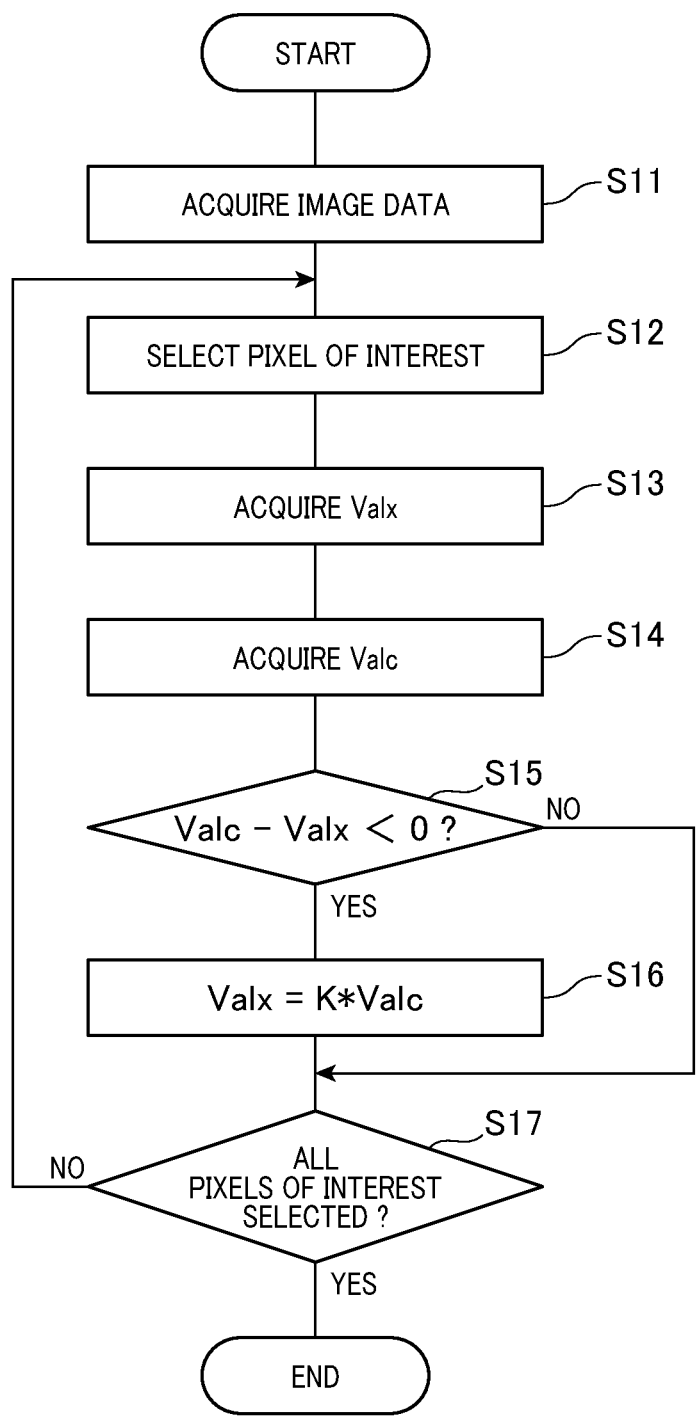
FIG. 5 is a flowchart of a correction process to be performed in the image processing apparatus.

In step S11 of FIG. 5, the image data acquisition unit 3 acquires the image data using the camera 11.

In step S12, the determination unit 5 selects one of the R-pixels, the B-pixels, and the G-pixels in the image data acquired in step S11. In the following descriptions, such a pixel is referred to as a pixel of interest. The pixel of interest is a pixel to which determination and correction in steps S13-S16 are made.

Selection of the pixel of interest is performed repeatedly until YES is determined in step S17 described later. The selection of the pixel of interest is performed in a predetermined order from the pixels other than already selected pixels.

In step S13, the determination unit 5 acquires a luminance value Valx of the pixel of interest last selected in step S12.

In step S14, the determination unit 5 selects the C-pixel spatially closest to the pixel of interest last selected in step S12. In the below, such a C-pixel is referred to as an adjacent C-pixel of interest. In the presence of a plurality of C-pixels of interest equally closest to the pixel of interest, the plurality of C-pixels of interest are also adjacent C-pixels of interest.

As an example, in FIG. 3, there are two adjacent C-pixels of interest to the R-pixel labelled P1: the C-pixel labelled P2 and the C-pixel labelled P3. There are four adjacent C-pixels of interest to the G-pixel labelled P4: the C-pixel labelled P2, the C-pixel labelled P5, the C-pixel labelled P6, and the C-pixel labelled P7. There are two adjacent C-pixels of interest to the B-pixel labelled P8: the C-pixel labelled P2 and the C-pixel labelled P7.

A luminance value Valc of the adjacent C-pixel of interest closest to the pixel of interest last selected in step S12 is acquired. In the presence of a plurality of adjacent C-pixels of interest, an average of luminance values of the plurality of adjacent C-pixels of interest is acquired and denoted by Valc.

In step S15, the determination unit 5 determines whether or not the following inequality (1) is satisfied.

$$Valc-Valx<0 \quad (1)$$

If the inequality (1) is satisfied, then it is determined that the luminance value Valx is abnormal, then the process flow proceeds to step S16. Otherwise, it is determined that the luminance value Valx is normal, then the process flow proceeds to step S17.

In step S16, the correction unit 7 corrects the luminance value of the pixel of interest last selected in step S12 to be less than the luminance value of the adjacent C-pixel of interest. More specifically, the luminance value of the pixel of interest is corrected to K*Valc (* represents multiplication), where K is the coefficient calculated in the coefficient calculation process.

In step S17, it is determined whether or not all the R-, B-, and G-pixels present in an area of the image data acquired in step S11 have been selected. If it is determined whether or not all such R-, B-, and G-pixels have been selected, then the process flow ends. Otherwise, the process flow proceeds to step S12, where one of the pixels remaining unselected is selected as the pixel of interest.

The area of the image data may be the whole or part of the image data. For example, the part of the image data may be an area in which the lane partition line recognition is performed.

4. Process to be Performed in Lane Partition Line Recognition Apparatus

The lane partition line recognition apparatus 13 uses the image data processed in the image processing apparatus 1 to recognize lane partition lines in a well-known manner. That is, the image data is demosaiced and then pixels in the image data where large variations in luminance occur are extracted as edge points. Approximate lines passing though the edge points are calculated by fitting (e.g., Hough transformation) as lane partition line candidates. For each of the lane partition line candidate, a lane partition line likeness (also referred to as a likelihood) is calculated. A lane partition line candidate having a lane partition line likeness equal to or higher than a predetermined threshold is recognized as a lane partition line.

5. Advantages (1A) The luminance value Valx of each pixel of interest should be less than the luminance value Valc of the adjacent C-pixel of interest. In the case of the luminance value Valx of a pixel of interest being greater than the luminance value Valc of the adjacent C-pixel of interest, the luminance value Valx of the pixel of interest is likely to have been affected by noise. In such a case, the image processing apparatus 1 corrects the luminance value Valx of the pixel of interest to be less than the luminance value Valc of the adjacent C-pixel of interest. This can reduce the effect of noise.

(1B) The image processing apparatus 1 determines whether or not the luminance value Valx of a pixel of interest is abnormal by comparing the luminance value Valx of a pixel of interest to the luminance value Valc of the adjacent C-pixel of interest. This makes it possible to more accurately determine whether or not the luminance value Valx of a pixel of interest is abnormal as compared to when the luminance value Valx of a pixel of interest is compared to the luminance value Valc of a pixel farther away from the adjacent C-pixel of interest. This can reduce a processing load of the image processing apparatus 1 as compared to a case where the luminance value Valx of a pixel of interest is compared to an average of luminance values of pixels adjacent the pixel of interest including not only closest C-pixel or pixels, but also closest R-, G-, and B-pixels.

(1C) The image processing apparatus 1 acquires Vx/Vc that is a ratio of the luminance value Vx of the selected pixel to the luminance value Vc of its adjacent C-pixel at each of the plurality of positions in the image data and calculates the average K of the acquired ratios. Thereafter, the image processing apparatus 1 corrects the luminance value Vx of the pixel of interest to K*Valc.

This allows the luminance value of the pixel of interest to be corrected properly depending on characteristics of the image data. The correction described above can prevent the color of the pixel of interest from being clouded and thus prevent the contrast from being lowered. This can also reduce a processing load of the image processing apparatus 1.

(1D) In the lane partition line recognition system 16 uses the image data processed in the image processing apparatus 1 to recognize the lane partition lines via the lane partition line recognition apparatus 13. The image data processed in the image processing apparatus 1 has noise reduced as described in (1A). Therefore, the lane partition line recognition system 16 can more accurately recognize the lane partition lines.

(Other Embodiments)

It is to be understood that the invention is not to be limited to the specific embodiment disclosed above and that modifications and other embodiments are intended to be included within the scope of the appended claims.

(1) In an alternative embodiment, in step S16, the corrected luminance value of a pixel of interest may be given by the luminance value Valc of adjacent C-pixel or pixels of interest multiplied by a constant less than one (e.g., ½). This can eliminate the need to calculate the coefficient K, which can reduce the processing load of the image processing apparatus 1.

(2) In an alternative embodiment, the inequality (1) used in step S15 may be replaced with the following inequality: Valc−Valx<α, where α may be a positive or negative number.

(3) In an alternative embodiment, in step S15, a ratio Valx/Valc may be calculated, and if a value of Valx/Valc is greater than a constant β, then it may be determined that the luminance value Valx is abnormal. If the value of Valx/Valc is equal to or less than the constant β, then it may be determined that the luminance value Valx is normal. The constant β may be set as appropriate to a positive value, for example, to one.

(4) In an alternative embodiment, the R-, B-, and G-pixels in the image data may be arranged in another arrangement other than the Bayer arrangement.

(5) In an alternative embodiment, the image data to be processed in the image processing apparatus 1 may include at least, a first group of pixels including the R-pixels holding respective luminance values in the red wavelength range and C-pixels holding respective luminance values in a wavelength range corresponding to the color of the first group pixels. The pixel arrangement in such image data may include an RCCC Bayer arrangement as shown in FIG. 6. The symbol "R" represents the R-pixel, and the symbol "C" represents the C-pixel.

The first group of pixels may consist of the R-pixels, or may include not only the R-pixels, but also other-color pixels (e.g., the B-pixels and/or the G-pixels). In the case of the first group of pixels consisting of the R-pixels, the wavelength range corresponding to the color of the first group pixels refers to a wavelength range including at least the red wavelength range. In the case of the first group of pixels including not only the R-pixels, but also other-color pixels, the wavelength range corresponding to colors of the first group pixels refers to a wavelength range including the red wavelength range and the other-color wavelength ranges.

If the luminance value Valx of the pixel of interest that is one of the first group of pixels exceeds the luminance value Valc of the C-pixel or pixels around the pixel of interest (e.g., the C-pixel or pixels closest to the pixel of interest), the luminance value Valx of the pixel of interest may be corrected to be less than the luminance value Valc.

In this alternative embodiment, the selection of the pixel of interest, the determination of whether or not the value of Valx exceeds the value of Valc, and the correction of the luminance value Valx of the pixel of interest may be made in similar manners to those of the first embodiment. The correction to the luminance value Valx of the pixel of interest may be made by multiplying the luminance value Valc of the C-pixel or pixels around the pixel of interest by a constant less than one (e.g., ½).

(6) In an alternative embodiment, the image processing apparatus 1 may be an apparatus other than the vehicle-mounted apparatus. The image processing apparatus 1 may be used for any other purpose other than the lane partition line recognition purpose (e.g., for a purpose of recognizing a vehicle, a pedestrian, a road shape, a road surface condition, and a light source and the like).

(7) In an alternative embodiment, in step S5, in the presence of a plurality of C-pixels closest to the selected pixel, some of the C-pixels may be set to be adjacent C-pixels. In step S14, in the presence of a plurality of C-pixels closest to the pixel of interest, some of the C-pixels may be set to be adjacent C-pixel of interest.

(8) In an alternative embodiment, in step S3, positions of the pixels to be selected may be fixed.

(9) In an alternative embodiment, the number of gradations of the image data is set as appropriate, for example, to 64, 128, 512, 1024 or the like.

(10) In step S9, the coefficient K may be set to a time average of Vx/Vc.

(11) The functions of one of components of any one of the first to third embodiments may be distributed to a plurality of components, or the functions of a plurality of components may be integrated into one component. At least part of the configuration of any one of the above embodiments may be replaced with a known configuration having a similar function. At least part of the configuration of any one of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(12) It should be appreciated that the invention is not to be limited to the image processing apparatuses disclosed above and that the present invention can be implemented in numerous ways, including as a system that includes any one of the image processing apparatuses as a component, a program for enabling a computer to function as any one of the image processing apparatuses, a non-transitory computer readable storage medium storing such a program, an image processing method, a ranging method and the like.

What is claimed is:

1. An image processing apparatus comprising:
an image data acquisition unit, using a processor, configured to acquire image data including R-pixels which are red pixels, holding respective red luminance values, B-pixels which are blue pixels, holding respective blue luminance values, G-pixels which are green pixels, holding respective green luminance values, and C-pixels which are clear pixels, holding respective luminance values in a wavelength range including wavelength ranges corresponding to red, blue and green;
a determination unit, using a processor, configured to determine whether or not an inequality given by Valc−Valx<α is satisfied, where Valx is a luminance value of a pixel of interest that is one of the R-pixels, the B-pixels, and the G-pixels in the image data, Valc is a luminance value of the C-pixel or C-pixels closest to the pixel of interest, and α is a constant;
a correction unit, using a processor, configured to, if the inequality is satisfied, correct the luminance value Valx of the pixel of interest to be less than the luminance value Valc of the C-pixel or C-pixels closest to the pixel of interest; and a coefficient calculation unit, using a processor, configured to acquire, for each of a plurality of pixels selected in different positions in the image data that is one of the R-pixels, the B-pixels, and the G-pixels in the image data, acquire a ratio Vx/Vc of a luminance value Vx of the pixel to a luminance value Vc of the C-pixel or C-pixels closest to the pixel of interest, and calculate an average K of the acquired ratios, wherein the correction unit is configured to correct the luminance value of the pixel of interest to K*Valc.

2. An image processing apparatus comprising:

an image data acquisition unit, using a processor, configured to acquire image data including R-pixels which are red pixels, holding respective red luminance values, B-pixels which are blue pixels, holding respective blue luminance values, G-pixels which are green pixels, holding respective green luminance values, and C-pixels which are clear pixels, holding respective luminance values in a wavelength range including wavelength ranges corresponding to red, blue and green;

a determination unit, using a processor, configured to determine whether or not an inequality given by Valc−Valx<$\alpha$ is satisfied, where Valx is a luminance value of a pixel of interest that is one of the R-pixels, the B-pixels, and the G-pixels in the image data, Valc is a luminance value of the C-pixel or C-pixels closest to the pixel of interest, and $\alpha$ is a constant;

a correction unit, using a processor, configured to, if the inequality is satisfied, correct the luminance value Valx of the pixel of interest to be less than the luminance value Valc of the C-pixel or C-pixels closest to the pixel of interest, wherein the correction unit is configured to correct the luminance value Valx of the pixel of interest to the luminance value Valc multiplied by a constant which is less than one.

* * * * *